United States Patent
Kim

(10) Patent No.: US 8,406,958 B2
(45) Date of Patent: Mar. 26, 2013

(54) WHEEL ALIGNMENT APPARATUS USING MOTOR-DRIVEN POWER STEERING AND CONTROL METHOD THEREOF

(75) Inventor: Jeong Ku Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/546,573

(22) Filed: Jul. 11, 2012

(65) Prior Publication Data

US 2013/0018550 A1    Jan. 17, 2013

(30) Foreign Application Priority Data

Jul. 12, 2011 (KR) .................. 10-2011-0069054

(51) Int. Cl.
*A01B 69/00* (2006.01)

(52) U.S. Cl. .................................................. 701/41
(58) Field of Classification Search .............. None
See application file for complete search history.

*Primary Examiner* — Thomas Tarcza
*Assistant Examiner* — Adam Alharbi
(74) *Attorney, Agent, or Firm* — Saliwanchik, Lloyd & Eisenschenk

(57) ABSTRACT

The present invention relates to a wheel alignment apparatus using a motor-driven power steering (MDPS) and a control method thereof. After a vehicle having the MDPS mounted therein is parked, a steering angle is detected and a wheel is aligned with the center by controlling an MDPS motor through a motor angular velocity and a motor current. Accordingly, the motor angular velocity of the MDPS motor which is actually driven to align the wheel with the center is controlled to improve the precision of motor control, regardless of external disturbance such as tire frictions or loads.

6 Claims, 3 Drawing Sheets

WHEEL ALIGNMENT APPARATUS USING MOTOR-DRIVEN POWER STEERING AND CONTROL METHOD THEREOF

CROSS-REFERENCE TO RELATED APPLICATION

This application claims the benefit under 35 U.S.C. §119 of Korean Patent Application No. 10-2011-0069054, filed Jul. 12, 2011, which is hereby incorporated by reference in its entirety.

BACKGROUND

Exemplary embodiments of the present invention relate to a wheel alignment apparatus using a motor-driven power steering (MDPS) and a control method thereof, and more particularly, to a wheel alignment apparatus using an MDPS and a control method thereof, which detects a steering angle and aligns a wheel with the center by controlling an MDPS motor through a motor angular velocity and a motor current, after a vehicle having the MDPS mounted therein is parked.

Examples of an electronic control unit (ECU) which is generally applied to a vehicle may include an MDPS which reduces a manipulation force of a steering wheel according to the speed of the vehicle such that a steering manipulation may be softly and quickly performed.

The MDPS is operated as follows. First, the ECU receives input signals from a steering angle sensor, a torque sensor, a vehicle speed sensor, and an engine RPM sensor, calculates a current value corresponding to a torque value, and supplies the calculated current value to an MDPS motor, when the steering wheel is steered. Then, the MDPS motor generates a power assist force through rotations and deceleration so as to rotate a universal joint, and operates a pinion and rack using the rotational power of the universal joint such that the steering wheel is steered through a tie rod. Accordingly, the MDPS has steering performance and feeling which are improved more than a hydraulic power steering.

In this connection, Korean Patent Laid-open Publication No. 10-2010-0007321 discloses a wheel alignment apparatus of a motor-driven power steering vehicle.

Although the above-described MDPS is used, a driver may feel inconvenient when performing center alignment of the steering wheel after parking the vehicle. When the driver starts the vehicle in a state where the center alignment is not carried out, a vehicle collision is likely to occur.

BRIEF SUMMARY

An embodiment of the present invention relates to a wheel alignment apparatus using an MDPS and a control method thereof, which detects a steering angle and aligns a wheel with the center by controlling an MDPS motor through a motor angular velocity and a motor current, after a vehicle having the MDPS mounted therein is parked.

In one embodiment, there is provided a wheel alignment apparatus using an MDPS. The wheel alignment apparatus includes: a request value generation unit configured to generate a request profile for center alignment according to a steering angle inputted from a steering angle sensor, when an activation command for center alignment of a wheel is inputted; a compensation value generation unit configured to generate a compensation profile based on values inputted through the steering angle sensor, a motor angular velocity sensor, and a motor current sensor; a steering position control unit configured to calculate a target steering angular velocity through the steering angle inputted from the steering angle sensor and a target profile obtained by adding up the request profile generated by the request value generation unit and the compensation profile generated by the compensation value generation unit, and convert the target steering angular velocity into a motor angular velocity; a motor angular velocity control unit configured to generate a driving current for driving the MDPS motor through the motor angular velocity inputted from the steering position control unit and a motor angular velocity inputted from the motor angular velocity sensor; a motor current control unit configured to compare the driving current generated by the motor angular velocity control unit to the motor current measured by the motor current sensor and drive the MDPS motor; and a switching unit configured to selectively switch the driving current generated by the motor angular velocity control unit and the driving current outputted from the MDPS torque control unit of the MDPS to the motor current control unit.

The wheel alignment apparatus may further include an activation switch configured to output the activation command for aligning the wheel with the center.

The request value generation unit may calculate an angular velocity for an acceleration period, a constant velocity period, and a deceleration period, based on an angle obtained by adding up a current angle, an angle to the wheel center, and an overshoot angle considering an angle changed by a self-alignment torque caused by a tire frictional force of the vehicle at the wheel center, according to the steering angle inputted from the steering angle sensor, and set a control error upper limit for each period to generate the request profile.

The compensation value generation unit may generate the compensation profile by adjusting the scale of variation in the motor current, as the motor current increases when external disturbance exists under a no-load condition.

In another embodiment, there is provided a control method of a wheel alignment apparatus using an MDPS includes: receiving, by a request value generation unit, a steering angle from a steering angle sensor when an activation command for center alignment of a wheel is inputted; generating, by the request value generation unit, a request profile for center alignment according to the steering angle; generating, by a compensation value generation unit, a compensation profile based on values inputted through the steering angle sensor, a motor angular velocity sensor, and a motor current sensor; compensating for, by a steering position control unit, the request profile by adding up the request profile generated by the request value generation unit and the compensation profile generated by the compensation value generation unit, calculating a target steering angular velocity for center alignment through the steering angle inputted from the steering angle sensor, and converting the calculated target steering angular velocity into a motor angular velocity; generating, by a motor angular velocity control unit, a driving current for driving the MDPS motor through the motor angular velocity converted by the steering position control unit and a motor angular velocity inputted from the motor angular velocity sensor; comparing, by a motor current control unit, the driving current generated by the motor angular velocity control unit to the motor current measured by the motor current sensor, and driving the MDPS motor; and switching, by a switching unit, an input of the motor current control unit to the MDPS torque control unit from the motor angular velocity control unit, when the driving current is outputted from the MDPS torque control unit of the MDPS.

The activation command may be inputted when a vehicle is parked.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION

Hereinafter, embodiments of the present invention will be described with reference to accompanying drawings. However, the embodiments are for illustrative purposes only and are not intended to limit the scope of the invention.

Figure 1:
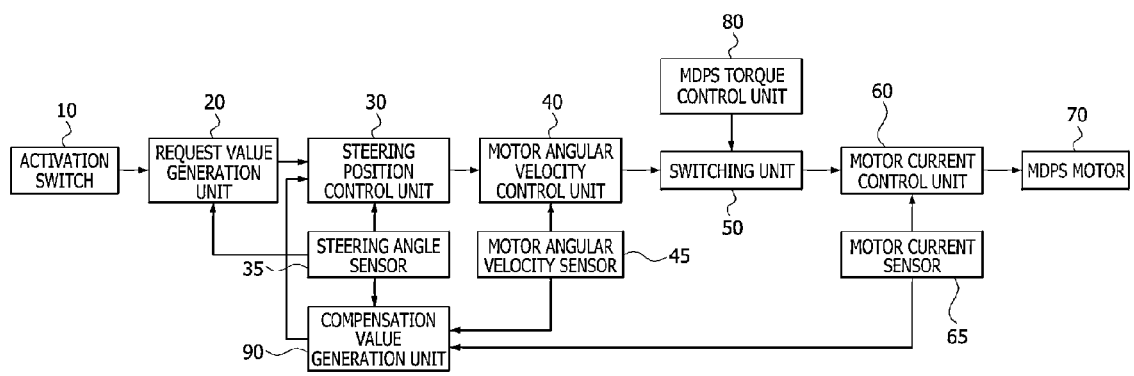
FIG. 1 is a block diagram illustrating a wheel alignment apparatus using an MDPS in accordance with an embodiment of the present invention.
Figure 2:
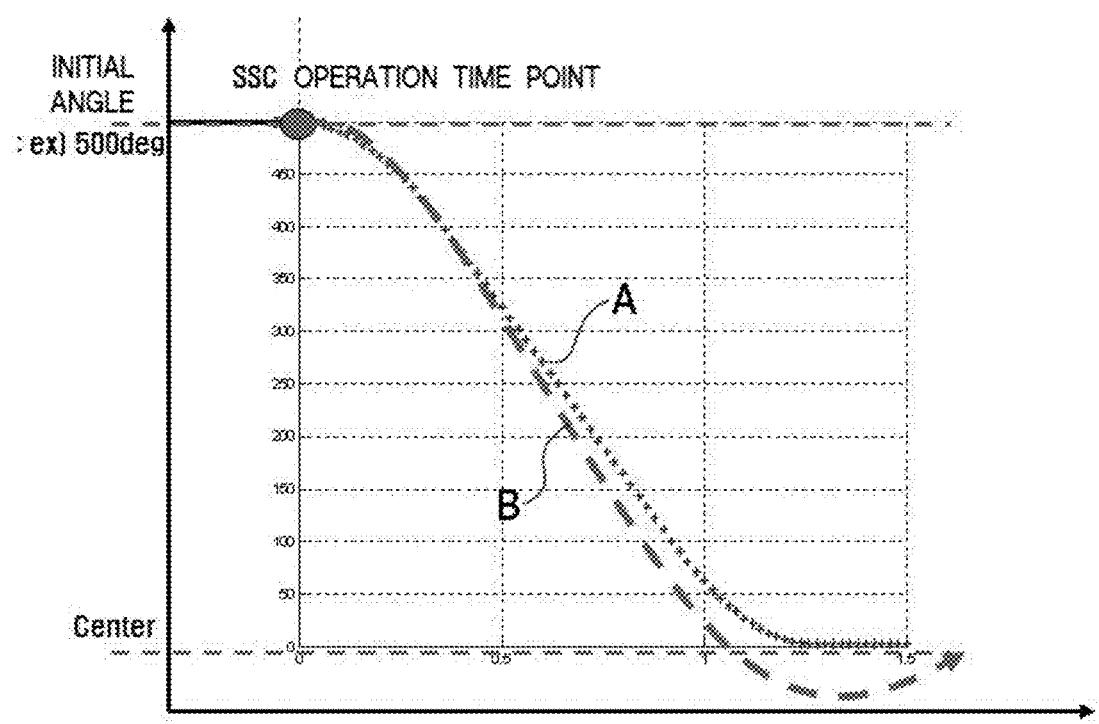
FIG. 2 is a graph showing a profile for center alignment, which is generated by the wheel alignment apparatus using an MDPS in accordance with the embodiment of the present invention.

FIG. 1 is a block diagram illustrating a wheel alignment apparatus using an MDPS in accordance with an embodiment of the present invention. FIG. 2 is a graph showing a profile for center alignment, which is generated by the wheel alignment apparatus using an MDPS in accordance with the embodiment of the present invention.

Referring to FIG. 1, the wheel alignment apparatus using an MDPS in accordance with the embodiment of the present invention includes a request value generation unit 20, a steering position control unit 30, a motor angular velocity control unit 40, a motor current control unit 60, an activation switch 10, a switching unit 50, an MDPS motor 70, an MDPS torque control unit 80, and a compensation value generation unit 90.

The request value generation unit 20 generates a request profile for center alignment according to a steering angle inputted from the steering angle sensor 35, when receiving an activation command for aligning a wheel of a vehicle having an MDPS mounted therein with the center.

At this time, the request value generation unit 20 calculates an angular velocity for an acceleration period, a constant velocity period, and a deceleration period, based on an angle obtained by adding up a current angle, an angle to the wheel center, and an overshoot angle considering an angle changed by a self-alignment torque caused by a tire frictional force of the vehicle at the wheel center, according to the steering angle inputted from the steering angle sensor 35, and sets a control error upper limit for each period to generate the request profile.

Therefore, the request value generation unit 20 determines to which period the steering angle inputted from the steering angle sensor 35 corresponds according to the request profile, sets a control target value of the corresponding period, and outputs the control target value as a control request value when the control target value does not exceed the control error upper limit for each period.

At this time, as indicated by a profile graph 'A' of FIG. 2, a steering angle acceleration may be adjusted to be tuned into a curve according to a driver's sensibility at the time of operation or center alignment.

The activation command is generated when the driver activates the activation switch 10 to align the wheel with the center after parking the vehicle.

Furthermore, the activation command is outputted only when the vehicle is determined to be parked, even though the activation switch 10 is activated.

Whether the vehicle is parked or not may be determined according to a typical method.

That is, the parking state of the vehicle is determined by checking whether or not a gear is shifted to P position in a state where the vehicle is stopped, or determined based on the open degree of a throttle valve, an engine RPM, the operation state of a brake and the like.

The steering position control unit 30 calculates a target steering angular velocity for center alignment through the request profile generated by the request value generation unit 20 and the steering angle inputted from the steering angle sensor 35, and converts the target steering angular velocity into a motor angular velocity.

At this time, a ratio of the steering angular velocity to the motor angular velocity is adjusted to set a limit value for inhibiting an output value from increasing indefinitely, when the target steering angular velocity is converted into the motor angular velocity.

Furthermore, the compensation value generation unit 90 generates a compensation profile using values inputted through the steering angle sensor 35, a motor angular velocity sensor 45, and a motor current sensor 65, and adds up the generated compensation profile and the request profile generated by the request value generation unit 20, thereby generating a target profile capable of minimizing an effect caused by external disturbance.

As shown in FIG. 2, the graph A indicates the request profile generated by the request value generation unit 20, and the target profile as indicated by a graph 'B' is generated by adding up the request profile and the compensation profile generated by the compensation generation unit 90 through a control amount learned through a back propagation algorithm of a neural network.

As such, the compensation value generation unit 90 periodically outputs a compensation profile through a learning process to estimate a compensation value while monitoring the steering angle, the motor angular velocity, and the motor current, and the steering position control unit 30 generates the target profile by adding up the request profile generated by the request value generation unit 20 and the compensation profile generated by the compensation value generation unit 90, and calculates the target steering angular velocity for center alignment through the steering angle inputted from the steering angle sensor 35.

When external disturbance exists under a no-load condition, the motor current increases. Therefore, the compensation value generation unit 90 generates the compensation profile by adjusting the scale of variation in the motor current. At this time, the compensation value generation unit 90 regulates the upper limit of the motor current variation caused by the external disturbance so as to limit a value exceeding the limit value of the self-alignment torque.

The motor angular velocity control unit 40 compares the motor angular velocity inputted from the steering position control unit 30 to the motor angular velocity inputted from the motor angular velocity sensor 45, and generates a driving current for driving the MDPS motor 70 through proportional-integral control.

At this time, the motor angular velocity control unit 40 sets a range to a limit value to secure stability for output.

The motor current control unit 60 compares the driving current generated by the motor angular velocity control unit 40 to the motor current measured by the motor current sensor 65, and drives the MDPS motor 70.

Furthermore, the wheel alignment apparatus using an MDPS in accordance with the embodiment of the present invention further includes the switching unit 50 which selectively switches a driving current outputted from the MDPS torque control unit 80 and the driving current generated from the motor angular velocity control unit 40, and supplies the driving current to the motor current control unit 60.

That is, the MDPS torque control unit 80 outputs a driving current for generating a power assist force according to a steering intention, when the driver steers the steering wheel.

Therefore, when a driver's steering intention is detected, the driving current outputted from the MDPS torque control unit 80 is switched by the switching unit 50 and inputted to the motor current control unit 60 to drive the MDPS motor 70 according to the driver's steering intention.

Figure 3:
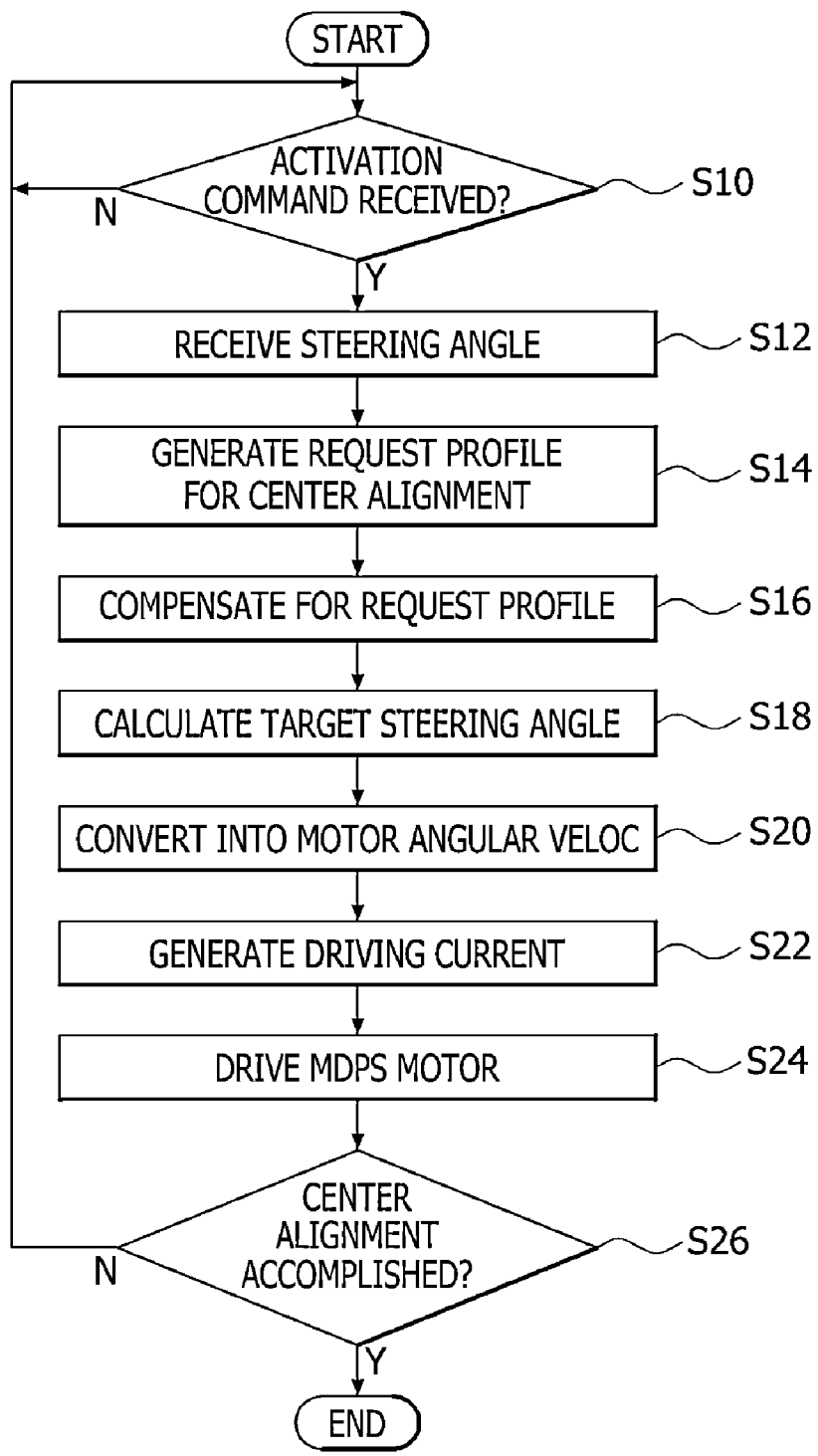
FIG. 3 is a flow chart explaining a control method of the wheel alignment apparatus using an MDPS in accordance with the embodiment of the present invention.

FIG. 3 is a flow chart explaining a control method of the wheel alignment apparatus using an MDPS in accordance with the embodiment of the present invention.

First, the request value generation unit 20 determines whether an activation command for center alignment is received or not, at step S10.

At this time, the activation command is generated when a driver activates the activation switch 10 to align the wheel with the center. In particular, the activation command is generated only when the vehicle is parked.

The parking state may be determined by checking whether or not a gear is shifted to P position in a state where the vehicle is stopped, or determined based on the open degree of the throttle valve, an engine RPM, the operation state of the brake and the like.

When the activation command for center alignment of the wheel is inputted, the request value generation unit 20 receives a steering angle from the steering angle sensor 35 at step S12.

Furthermore, the request value generation unit 20 generates a request profile for center alignment as indicated by the graph A of FIG. 2, according to the inputted steering angle, at step S14.

Furthermore, the compensation value generation unit 90 periodically outputs a compensation profile through a learning process using the back propagation algorithm of the neural network to estimate a compensation value while monitoring the steering angle, the motor angular velocity, and the motor current, and the steering position control unit 30 compensates for the request profile by adding up the request profile generated by the request value generation unit 20 and the compensation profile generated by the compensation value generation unit 90, thereby generating a target profile as indicated by the graph B of FIG. 2.

Then, a target steering angular velocity for center alignment is calculated through the target profile generated by the steering position control unit 30 and the steering angle inputted from the steering angle sensor 35, at step S18.

The calculated target steering angular velocity is converted into a motor angular velocity for controlling the MDPS motor 70 at step S20.

Then, the motor angular velocity control unit 40 generates a driving current for driving the MDPS motor 70 through the converted motor angular velocity and the motor angular velocity inputted from the motor angular velocity sensor 45 at step S22.

The driving current generated in such a manner is inputted to the motor current control unit 60, and the motor current control unit 60 compares the driving current to the motor current measured by the motor current sensor 65 and drives the MDPS motor 70 at step S24.

Then, while the MDPS motor 70 is driven, the steering angle is continuously monitored to determine whether the wheel is aligned with the center or not. The MDPS motor 70 is driven until the center alignment is accomplished. When the center alignment is accomplished, the activation command is canceled at step S26.

Meanwhile, when the driving current is outputted from the MDPS torque control unit 80 of the MDPS, it is determined that the driver has a steering intention. Accordingly, the driving current outputted from the MDPS torque control unit 80 is switched by the switching unit 50 and inputted to the motor current control unit 60.

In accordance with the wheel alignment apparatus using an MDPS and the control method thereof, the motor angular velocity of the MDPS motor 70 which is actually driven to align the wheel with the center may be controlled to improve the precision of motor control, regardless of external disturbance such as tire frictions or loads.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A wheel alignment apparatus using a motor-driven power steering (MDPS) comprising:
   a request value generation unit configured to generate a request profile for center alignment according to a steering angle inputted from a steering angle sensor, when an activation command for center alignment of a wheel is inputted;
   a compensation value generation unit configured to generate a compensation profile based on values inputted through the steering angle sensor, a motor angular velocity sensor, and a motor current sensor;
   a steering position control unit configured to calculate a target steering angular velocity through the steering angle inputted from the steering angle sensor and a target profile obtained by adding up the request profile generated by the request value generation unit and the compensation profile generated by the compensation value generation unit, and convert the target steering angular velocity into a motor angular velocity;
   a motor angular velocity control unit configured to generate a driving current for driving the MDPS motor through the motor angular velocity inputted from the steering position control unit and a motor angular velocity inputted from the motor angular velocity sensor;
   a motor current control unit configured to compare the driving current generated by the motor angular velocity control unit to the motor current measured by the motor current sensor and drive the MDPS motor; and
   a switching unit configured to selectively switch the driving current generated by the motor angular velocity control unit and the driving current outputted from the MDPS torque control unit of the MDPS to the motor current control unit.

2. The wheel alignment apparatus of claim 1, further comprising an activation switch configured to output the activation command for aligning the wheel with the center.

3. The wheel alignment apparatus of claim 1, wherein the request value generation unit calculates an angular velocity for an acceleration period, a constant velocity period, and a deceleration period, based on an angle obtained by adding up a current angle, an angle to the wheel center, and an overshoot angle considering an angle changed by a self-alignment torque caused by a tire frictional force of the vehicle at the wheel center, according to the steering angle inputted from the steering angle sensor, and sets a control error upper limit for each period to generate the request profile.

4. The wheel alignment apparatus of claim 1, wherein the compensation value generation unit generates the compensation profile by adjusting the scale of variation in the motor current, as the motor current increases when external disturbance exists under a no-load condition.

5. A control method of a wheel alignment apparatus using an MDPS comprising:
  receiving, by a request value generation unit, a steering angle from a steering angle sensor when an activation command for center alignment of a wheel is inputted;
  generating, by the request value generation unit, a request profile for center alignment according to the steering angle;
  generating, by a compensation value generation unit, a compensation profile based on values inputted through the steering angle sensor, a motor angular velocity sensor, and a motor current sensor;
  compensating for, by a steering position control unit, the request profile by adding up the request profile generated by the request value generation unit and the compensation profile generated by the compensation value generation unit, calculating a target steering angular velocity for center alignment through the steering angle inputted from the steering angle sensor, and converting the calculated target steering angular velocity into a motor angular velocity;
  generating, by a motor angular velocity control unit, a driving current for driving the MDPS motor through the motor angular velocity converted by the steering position control unit and a motor angular velocity inputted from the motor angular velocity sensor;
  comparing, by a motor current control unit, the driving current generated by the motor angular velocity control unit to the motor current measured by the motor current sensor, and driving the MDPS motor; and
  switching, by a switching unit, an input of the motor current control unit to the MDPS torque control unit from the motor angular velocity control unit, when the driving current is outputted from the MDPS torque control unit of the MDPS.

6. The control method of claim 5, wherein the activation command is inputted when a vehicle is parked.

* * * * *